3,046,240
THERMO-SETTING CEMENT CONTAINING FURFURAL AND PITCH
Lester L. Winter, Fostoria, and Theodore Edstrom, Parkview, Ohio, assignors to Union Carbide Corporation, a corporation of New York
No Drawing. Original application Oct. 11, 1955, Ser. No. 539,947, now Patent No. 2,884,391, dated Apr. 28, 1959. Divided and this application Feb. 24, 1959, Ser. No. 794,827
2 Claims. (Cl. 260—28.5)

This application is a division of our application Serial No. 539,947, filed October 11, 1955, now U.S. Patent 2,884,391, issued April 28, 1959, itself a continuation-in-part of our previous application, Serial No. 323,159, filed November 28, 1952, and now abandoned.

This invention relates to a thermosetting cement of a type particularly useful in joining carbon and graphite articles such as bricks, electrodes, rods and pipes.

Conventional cements for joining carbon and graphite articles consist principally of pitch and a volatile plasticizer. These cements are applied to the articles to be joined, and heated moderately to drive off the plasticizer and set the cement. These cements have the disadvantage of softening when heated substantially above the melting point of the pitch, and losing their strength. Also because they do not set until the volatile plasticizer is driven off, these cements are difficult to apply to vertical and uneven surfaces.

The principal object of the present invention is to provide a cement for carbon and graphite articles which retains its strength at relatively high temperatures.

A further object is to provide a cement suitable for joining carbon and graphite articles that has a high apparent density upon setting.

Still another object is to provide a cement which has thixotropic properties such that it remains in position during the time required to harden it.

These objects are accomplished by mixing together, in the proper proportions as set forth below, a pitch, a plasticizer, and a catalyst, the pitch having a high melting point, the plasticizer being an organic compound containing a furfuryl radical, and the catalyst being an acid. These materials, when mixed and blended, form a cement which when heated does not soften and retains its strength. The cement of the invention stiffens readily upon application.

The pitch used in the cement of the invention should be relatively free of volatile constituents so as to minimize the escape of volatile materials when the cement is heated. The properties required in a pitch to give satisfactory results are as follows: The melting point should be between 150° C. and 225° C.; the coking value at 1000° C. should be between 60 percent and 80 percent; the solubility in quinoline should be between 75 percent and 85 percent; the specific gravity should be not less than 1.25, and the pitch should be compatible with furfuryl compounds at temperatures below 100° C. A melting point of about 175° C. is preferred. In general, cements containing pitches having melting points in the upper part of the range will remain plastic for only a relatively short period of time, at temperatures of between about 60° C. and 75° C., the temperatures at which such cements are most advantageously applied. Because of this, cements made with the higher melting point pitches should not be held at application temperatures for prolonged periods of time.

The plasticizer in the cement of the invention is an organic compound containing the furfuryl radical. Examples of suitable compounds are furfural and furfuryl alcohol. Mixtures of these two materials and a mixture of furfuryl alcohol, phenol and formaldehyde have given excellent results. The plasticizer dissolves the pitch at least in part, and renders the cement fluid for a time after the constituents are mixed. By increasing or decreasing the ratio of plasticizer to pitch, the viscosity of the cement can be decreased or increased, respectively. Upon standing in the presence of the catalyst, the furfuryl compounds polymerize, and thus cause the cement to harden. The polymerization is accelerated by heating the cement. The rate of polymerization for a given mixture of pitch and plasticizer can be increased by increasing the amount of catalyst and heat applied to the cement. This control over the rate of polymerization permits the formulation of quick setting or slow setting cements to meet specific requirements.

Best results are obtained when the pitch and plasticizer are present in the cement in the following proportions: 47 percent to 55 percent pitch, 53 percent to 45 percent plasticizer. Satisfactory cements have been made with pitch to plasticizer ratios of as high as 6 to 4. The ratio of plasticizer to pitch should not be greatly in excess of 1 to 1.

Acids generally have been found to be efficacious as catalysts for the polymerization of the plasticizer. In the same category are acid engendering materials. In the appended claims the term "acid catalyst" will be used to designate both acids and acid engendering materials. Particularly good results have been obtained with benzene sulfonyl chloride and mixtures of this material with concentrated hydrochloric acid. Other acid catalysts are hydrochloric acid alone, sulfur chloride, sulfuric acid, and boron trifluoride complexes. For most purposes 2 percent to 5 percent catalyst by weight of the cement has been found to be adequate. No particular benefits are obtained with amounts of catalyst in excess of 10 percent.

In addition to the materials already specified as essential components of the cement of the invention, certain other constituents have been found to impart desirable properties to the cement. For cementing rough surfaces the strength of the cement is improved by the addition of solid carbonaceous particles to it. The solid carbonaceous particles should be milled or otherwise comminuted so that the average particle size is not in excess of 100 mesh, and preferably no larger than 150 to 200 mesh. The carbonaceous particles, for example coke flour and blacks, exert a strong influence on the viscosity of the cement. In addition, acetylene black, when added to the cement, causes the cement to assume an initial set in an exceedingly short time. This property can be employed to hold the cement in place until the plasticizer is polymerized, thus facilitiating its use in places from which a fluid would normally flow. It is preferred to use no more than from 35 percent to 45 percent of the particles, because with larger amounts the viscosity of the cement is too great.

When solid carbonaceous particles are added to the cement of the invention, best results have been obtained with compositions within the following range: 20 percent to 32 percent pitch, 20 percent to 32 percent plasticizer, 30 percent to 47 percent carbonaceous particles, and 2 percent to 10 percent catalyst.

When heated, the cement does not soften as do the conventional pitch base cements of the prior art. Instead the cement will coke when heated sufficiently. In most instances an increase in strength is exhibited by joints prepared with the cement of the invention when the joint is heated to temperatures above 500° C.

Preferred compositions for cements having a wide range of viscosities at room temperatures are given in Table I.

Table I

|  | Low Viscosity Cement, percent | Intermediate Viscosity Cement, percent | High Viscosity Cement, percent |
|---|---|---|---|
| 175° C. M.P. pitch | 26.54 | 27.7 | 25.75 |
| Furfural | 30.4 | 27.7 | 25.75 |
| Coke Flour | 39.0 | 40.6 | 44.7 |
| Acetylene Black | 0.96 | 1.2 | 1.13 |
| Benzene Sulfonyl Chloride | 2.04 | 1.84 | 1.71 |
| Concentrated HCl Acid | 1.06 | 0.96 | 0.96 |

Joints are made with the cement of the invention in the conventional manner. After the cement is spread on the surfaces to be joined, the surfaces are pressed together, and the cement hardened by standing or heating. Best results have been obtained with cements having an intermediate viscosity by applying them to warm surfaces suitably at a temperature of from about 50° C. to 60° C. The low viscosity cements can be applied satisfactorily to cold surfaces, while the higher viscosity cements should be applied to surfaces having a temperature of from 20° C. to 40° C. Joint strengths in the neighborhood of 1000 pounds per sqaure inch are common with the cement of the invention.

The advantages to be obtained by using the cement of the invention in making joints between carbonaceous articles can be seen readily from the data in Table II. The data was compiled by making mixtures of the furfuryl compounds and a number of pitches. The effect of the properties of the pitch was determined from the tests.

Table II

| Pitch Properties | Tensile Strength of Cemented Joints Made with Cements of Furfuryl Alcohol and Coal Tar Pitches | | | | |
|---|---|---|---|---|---|
|  | 1 | 2 | 3 | 4 | 5 |
| Melting Point (° C.) | 25 | 100 | 150 | 175 | 225 |
| Solubility in Quinoline (percent) | 98 | 88 | 84 | 81 | 83 |
| Coking Value at 1000° C. (percent) | 35 | 55 | 63 | 66 | 76 |
| Specific Gravity |  | 1.28 | 1.28 | 1.30 | <1.25 |
| Tensile Strength p.s.i.: |  |  |  |  |  |
| 1. Joint Baked to 500° C | 0 | 0 | 107 | 350 |  |
| 2. Joint Baked to 1000° C | 0 | 0 |  | 1,000 | 770 |

Of the cements tested and reported in Table II, only those containing pitches numbered 3, 4 and 5 satisfied the requirements of the cement of the invention. From the data it can be seen that the cements containing low-melting point pitches, i.e., melting points of 25° C. and 100° C., had no appreciable tensile strength when the joints made with them were baked to temperatures as low as 500° C. On the other hand, the cements of the invention had tensile strengths up to 1000 pounds per square inch, and in the case of the cement made with pitch No. 4, actually exhibited an increase in strength when heated to temperatures as high as 1000° C.

What is claimed is:

1. A thermosetting cement for joining carbonaceous articles, said cement consisting of about 60 percent to 50 percent of a pitch, about 40 percent to 50 percent in the aggregate of at least one of the materials in the group consisting of furfural and furfuryl alcohol, and about two to 10 percent of an acid catalyst; said pitch having a melting point of between 150° C. and 225° C., a coking value at 1000° C. of from 60 percent to 80 percent, having a solubility in quinoline of 75 percent to 85 percent, having a specific gravity of at least 1.25, and being compatible with furfuryl compounds at temperatures below 100° C., said percentages based on the total weight of said cement.

2. A thermosetting cement for joining carbonaceous articles, said cement consisting of about 60 percent to 50 percent of a pitch, about 40 percent to 50 percent in the aggregate of at least one of the materials in the group consisting of furfural and furfuryl alcohol, and from 2 percent to 10 percent in the aggregate of at least one of the materials in the group consisting of hydrochloric acid, sulfur chloride sulfuric acid, boron trifuoride complexes and benzene sulfonyl chloride; said pitch having a melting point of between 150° C. and 225° C., a coking value at 1000° C. of from 60 percent to 80 percent, having a solubility in quinoline of 75 percent to 85 percent, having a specific gravity of at least 1.25, and being compatible with furfuryl compounds at temperatures below 100° C., said percentages based on the total weight of said cement.

References Cited in the file of this patent

UNITED STATES PATENTS

| 2,174,887 | Kiefer | Oct. 3, 1939 |
| 2,314,181 | Winterkorn | Mar. 16, 1943 |
| 2,884,391 | Winter et al. | Apr. 28, 1959 |

FOREIGN PATENTS

| 352,521 | Germany | Apr. 27, 1922 |

OTHER REFERENCES

Modern Plastics, July 1946, pages 126–129.